United States Patent
Li et al.

(10) Patent No.: US 11,383,144 B2
(45) Date of Patent: Jul. 12, 2022

(54) POSITIONAL ANALYSIS USING COMPUTER VISION SENSOR SYNCHRONIZATION

(71) Applicant: Intel Corporation, Santa Clara, CA (US)

(72) Inventors: Qiang Eric Li, Beijing (CN); Wenlong Li, Beiling (CN); Shaohui Jiao, Beijing (CN); Yikai Fang, Beijing (CN); Xiaolu Shen, Beijing (CN); Lidan Zhang, Beijing (CN); Xiaofeng Tong, Beijing (CN); Fucen Zeng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 17/093,215

(22) Filed: Nov. 9, 2020

(65) Prior Publication Data

US 2021/0069571 A1    Mar. 11, 2021

Related U.S. Application Data

(63) Continuation of application No. 15/574,109, filed as application No. PCT/CN2016/113668 on Dec. 30, 2016, now Pat. No. 10,828,549.

(51) Int. Cl.
*A63B 71/06* (2006.01)
*G09B 19/00* (2006.01)
(Continued)

(52) U.S. Cl.
CPC ........... *A63B 71/06* (2013.01); *G06T 7/20* (2013.01); *G06V 10/34* (2022.01); *G06V 20/40* (2022.01);
(Continued)

(58) Field of Classification Search
CPC .................................................... A63B 71/06
(Continued)

(56) References Cited

U.S. PATENT DOCUMENTS 9,211,439 B1    12/2015   Pedenko
9,248,361 B1    2/2016    Jones
(Continued)

FOREIGN PATENT DOCUMENTS

CN    105705090      6/2016
WO    2013109795     7/2013
(Continued)

OTHER PUBLICATIONS

U.S. Appl. No. 15/574,109, U.S. Pat. No. 10,828,549, filed Nov. 14, 2017, Positional Analysis Using Computer Vision Sensor Synchronization.
(Continued)

*Primary Examiner* — Kesha Frisby
(74) *Attorney, Agent, or Firm* — Schwegman Lundberg & Woessner, P.A.

(57) ABSTRACT

System and techniques for positional analysis using computer vision sensor synchronization are described herein. A set of sensor data may be obtained for a participant of an activity. A video stream may be captured in response to detection of a start of the activity in the set of sensor data. The video stream may include images of the participant engaging in the activity. A key stage of the activity may be identified by evaluation of the sensor data. A key frame may be selected from the video stream using a timestamp of the sensor data used to identify the key stage of the activity. A skeletal map may be generated for the participant in the key frame using key points of the participant extracted from the
(Continued)

key frame. Instructional data may be selected using the skeletal map. The instructional data may be displayed on a display device.

21 Claims, 8 Drawing Sheets

(51) Int. Cl.
    *G06V 10/34*       (2022.01)
    *G06V 20/40*       (2022.01)
    *G06V 40/20*       (2022.01)
    *G06T 7/20*         (2017.01)

(52) U.S. Cl.
    CPC .............. *G06V 20/42* (2022.01); *G06V 40/23* (2022.01); *G09B 19/0038* (2013.01); *G06T 2207/30221* (2013.01); *G06T 2207/30241* (2013.01); *G06V 20/44* (2022.01)

(58) Field of Classification Search
    USPC ........................................................ 434/247
    See application file for complete search history.

(56) References Cited

U.S. PATENT DOCUMENTS

| | | |
|---|---|---|
| 9,396,385 B2 | 7/2016 | Bentley et al. |
| 10,828,549 B2 | 11/2020 | Li et al. |
| 2013/0274587 A1 | 10/2013 | Coza et al. |
| 2014/0135960 A1 | 5/2014 | Choi |
| 2014/0243710 A1 | 8/2014 | Jeong |
| 2015/0328523 A1 | 11/2015 | Heiling et al. |
| 2016/0038088 A1 | 2/2016 | Lari et al. |
| 2018/0353836 A1 | 12/2018 | Li et al. |

FOREIGN PATENT DOCUMENTS

| | | |
|---|---|---|
| WO | 2015109442 | 7/2015 |
| WO | 2018120092 | 7/2018 |

OTHER PUBLICATIONS

"V1 Golf App: V1 Golf App for iOS and Android Devices", V1 Sports, [Online] Retrieved from the Internet: URL: http:v1sports.com athletes-consumers v1-golf-app , (Accessed on: Dec. 1, 2016), 4 pgs.

"TruSwing", Garmin, [Online]. Retrieved from the Internet: URL: https: buy.garmin.com en-US US into-sports golfing truswing-prod505083.html, (Accessed on: Dec. 1, 2016), 5 pgs.

"Mobiplex Unveils New SwingTIP ProView Mobile App for Golf Swing Improvement with Auto-Video Capture and Instructor-style 3D Power and Plane Analysis", Mobiplex Inc., [Online]. Retrieved from the Internet: URL: http: www.mobiplex.com press swingtip-proview-mobile-app.html, (Apr. 9, 2013), 3 pgs.

"International Application Serial No. PCT CN2016 113668, International Search Report dated Aug. 25, 2017", 4 pgs.

"International Application Serial No. PCT CN2016 113668, Written Opinion dated Aug. 25, 2017", 4 pgs.

"U.S. Appl. No. 15/574,109, Non Final Office Action dated Oct. 21, 2019", 5 pgs.

"U.S. Appl. No. 15/574,109, Response filed Mar. 23, 2020 to Non Final Office Action dated Oct. 21, 2019", 12 pgs.

"U.S. Appl. No. 15/574,109, Notice of Allowance dated Jul. 1, 2020", 8 pgs.

"U.S. Appl. No. 15/574,109, Corrected Notice of Allowability dated Aug. 20, 2020", 2 pgs.

Chun, Sungkuk, "A sensor-aided self coaching model for uncocking improvement in golf swing", Multimedia Tools and Applications, 72(1), (Sep. 2014), 253-279.

Krog-Work, Oystein, "Supported Cameras", Swing Catalyst Help Center, [Online]. Retrieved from the Internet URL: https: support.swingcatalyst.com hc en-us articles 200967858-Supported-Cameras, (Jun. 30, 2016), 5 pgs.

POSITIONAL ANALYSIS USING COMPUTER VISION SENSOR SYNCHRONIZATION

PRIORITY APPLICATION

This application is a continuation of U.S. application Ser. No. 15/574,109, filed Nov. 14, 2017, which is a U.S. National Stage Filing under 35 U.S.C. 371 from International Application No. PCT/CN2016/113668, filed on 30 Dec. 2016, published as WO 2018/120092, all of which are incorporated herein by reference in their entirety.

TECHNICAL FIELD

Embodiments described herein generally relate to positional analysis and, in some specific embodiments, to using computer vision sensor synchronization for positional analysis.

BACKGROUND

An individual undertakes a variety of activities. The individual may wish to improve performance for a particular activity. Knowing the position of the individual's body during performance of the activity may help the individual improve performance of the activity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
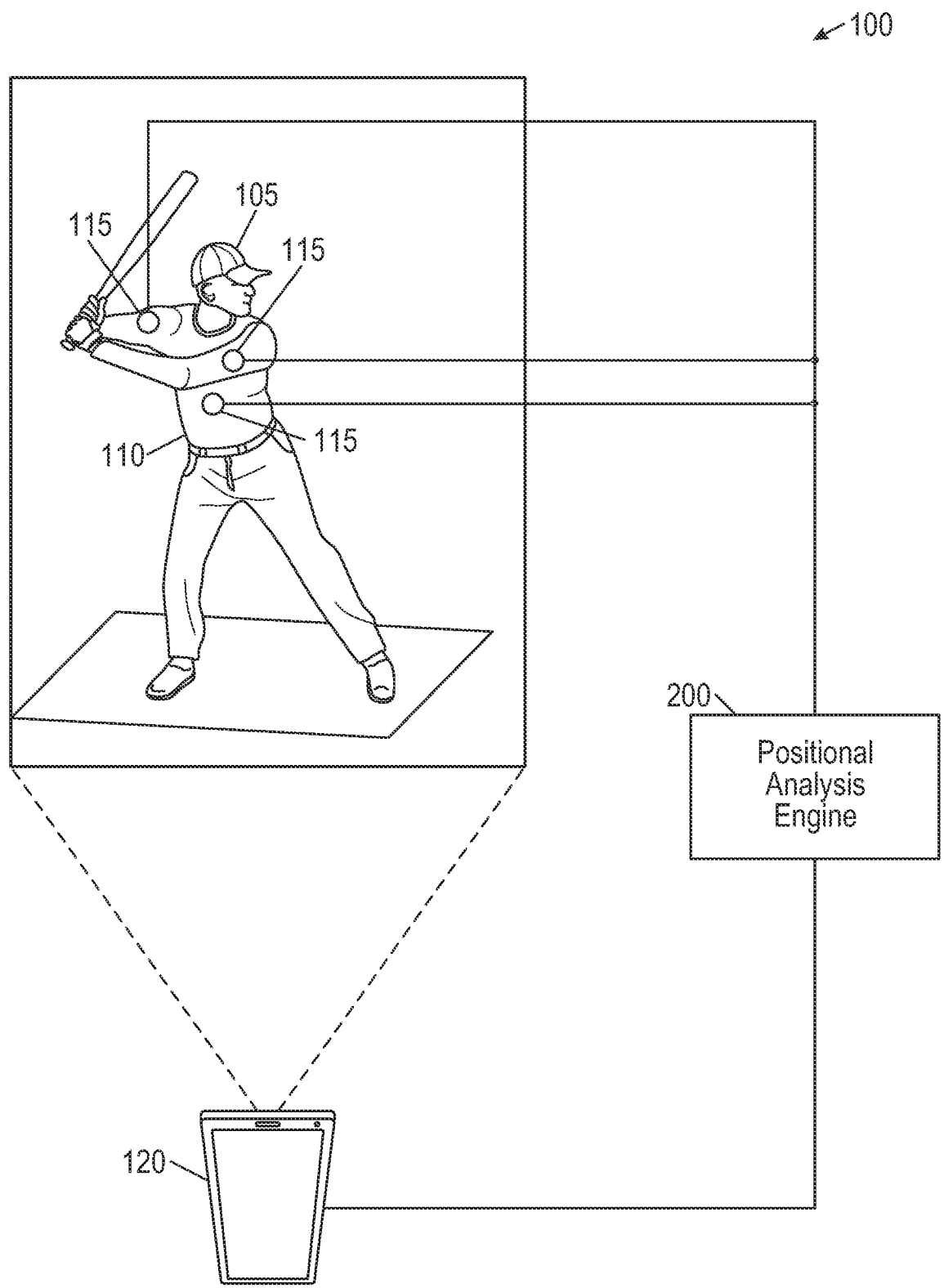
FIG. 1 is a block diagram of an example of an environment and a system for positional analysis using computer vision sensor synchronization, according to an embodiment.

Individuals may participate in a variety of activities such as sports in which the position of the participant may have an impact on the participant's performance in the activity. For example, in baseball, swing position may have an impact on the participant's ability to make contact with the ball as well as on the distance a struck ball may travel. Traditional activity sensor technology may be able to collect data about a baseball swing, however, a sensor attached to a bat or the participant may not provide detail at individual stages of an activity-such as a back swing stage of a baseball swing—that would allow the participant to fine tune the swing.

An activity may be broken down into stages that may each be significant in the performance of the activity. For example, a baseball swing may include stance, timing, hitting, rotation, contact, and extension stages. Traditional sensor based techniques may provide data throughout the entire swing without identifying the stages of the swing, denying the participant the knowledge to improve his technique at each stage of the swing. Traditional video based analysis techniques may break an activity into stages, however, identifying key frames in an activity video may be an imprecise manual exercise. Even when the proper frame for a stage of the activity is identified, the image may provide pose information without additional sensor data to inform the participant regarding the impact of pose adjustments.

The systems and techniques disclosed herein synchronize sensor data and a video stream for an activity to automatically detected stages of the activity. The beginning and end of an activity, including intervening key frames, may be identified in the video stream using the sensor data. To increase accuracy, the participant may be provided with a display of the identified key frames which the user may be able to adjust (e.g., move forward or back ward through frames of the video stream, etc.).

A skeletal map may be generated for the participant including an estimation of the location of the participant's joints which may be compared to a reference skeletal map for the key frame to identify how the participant's pose deviates from a reference pose. To increase accuracy, the participant may be provided with a display of a modifiable skeletal map. The participant may be able to adjust the joint locations to better represent the participant's skeletal structure. The modified skeletal map may be used to refine the pose of the participant and fine tune the instructional output provided to the participant using the deviation between the participant's skeletal map and the reference skeletal map for the key frame. The sensor data for the key frame may be provided to the participant so that the participant may observe the impact that pose changes make in performing the activity. Thus, by automatically identifying key frames in a video feed using sensor data, analyzing the key frames using the skeletal map, and providing a feedback loop with the participant, the present subject matter efficiently provides accurate pose and movement data the participant may use to increase competency in the activity.

FIG. 1 is a block diagram of an example of an environment 100 including a system for positional analysis using computer vision sensor synchronization (e.g., positional analysis system 200), according to an embodiment. The environment 100 may include a participant 105 engaging in an activity (e.g., swinging a baseball bat, etc.). The participant 105 may be wearing a piece of smart clothing 110 (e.g., a smart shirt, etc.) including an array of sensors 115. A mobile device 120 (e.g., smartphone, tablet, etc.) may include a camera and may capture a video stream of the participant 105 performing the activity. The mobile device 120 and the array of sensors may be communicatively coupled (e.g., via a network, shared bus, etc.) when in operation to the positional analysis engine 200.

The array of sensors 115 may include a variety of sensor units including, for example, an accelerometer, a gyroscope, etc. The array of sensors 115 may collect a variety of motion data for the participant 105 such as, for example, acceleration, rotation, deceleration, etc. For example, the participant 105 may be swinging at a baseball and the array of sensors 115 may collect the acceleration and rotation of the participant's body or portions thereof.

As noted above, the mobile device 120 may include an imaging device such as a camera and may capture a video stream of the participant 105 engaging in the activity. In some examples, the mobile device 120 may capture the video stream in response to activation (e.g., initialization, detection of movement, etc.) of the array of sensors 115. The mobile device 120 may be positioned so that the captured video stream includes a portion (or the entirety) of the participant's body.

The positional analysis engine 200 may receive, as inputs, the data collected by the array of sensors 115 and the mobile device 120. For example, the positional analysis engine 200 may receive accelerometer data and gyroscope data from the array of sensors 115 and the video stream from the camera of the mobile device 120. The positional analysis engine 200 may evaluate the data received from the array of sensors 115 using machine learning techniques to identify a start time (e.g., a timestamp, etc.) and an end time of the activity. For example, features of the sensor data may be extracted and compared to features of a baseball swing model to identify that a baseball swing has begun. The sensor data may be further compared to identify stages of the activity through completion. For example, the continuing evaluation of the sensor data to the model may identify that the participant 105 has begun a swing at a stance stage and has progressed through a timing stage, a hitting stage, a rotation stage, a contact stage, and has completed the activity with an extension stage. In some examples, detection of the start time may activate the camera of the mobile device 120 to begin capturing the video stream. For example, the sensor data may be evaluated against the model in real-time and the camera of the mobile device 120 may be activated when it is determined that the participant 105 has begun the baseball swing at the stance stage.

The positional analysis engine 200 may use the identified stages of the activity to select key frames from the video stream. The sensor data and the video data may be synchronized (e.g., by timestamp, etc.) so that the key frame selected for each stage has an equivalent timestamp to the sensor data used to determine the stage of the activity. For example, sensor data at timestamp 0.0001 may be used to determine that the participant 105 is at the stance stage of a baseball swing and an image from the video stream at timestamp 0.0001 may be selected as the key frame for the stance stage of the activity.

In some examples, the positional analysis engine 200 may generate output for display on a display device (e.g., screen, touchscreen, etc.) of the mobile device 120. The output may include the key frame of the video stream corresponding to each stage of the activity with (e.g., as an overlay, etc.) a reference position generated (e.g., using machine learning, etc.) for the participant 105 engaging in the activity at the corresponding stage of the activity. The displayed output may be interactive allowing the participant 105 to adjust the key frame. For example, the key frame may be displayed with an overlay of the participant 105 engaging in a stance stage of a baseball swing and the participant 105 may be able to scroll forward and backward through frames of the video stream to identify a frame that the participant 105 believes is a better match for the stage of the activity. The positional analysis engine 200 may receive the frame selected by the participant 105 and may set the frame as the key frame for the identified stage of the activity.

The positional analysis engine 200 may use the key frame to generate a skeletal model for the participant 105. Key points (e.g., head, arm, leg, etc.) of the participant's 105 body may be identified. The key points may be used to determine joint (e.g., knee, elbow, etc.) locations for the participant 105. For example, the key points may be input into a deep learning based algorithm to output the joint locations based on distances between the key points. In some examples, the skeletal map is presented on a display of the mobile device. The skeletal map may be interactive allowing the participant 105 to adjust joint locations for increased accuracy. The adjustments may be received and the skeletal map may be updated.

The positional analysis engine 200 may select instructional data (e.g., tips for completing the activity, pose feedback, etc.) using the skeletal map. Biometric data may be estimated through computing an angle, distance, etc. between joint locations in the skeletal map in the key frame. The biometric data may be feed into a rule based (e.g., if-then, decision tree, etc.) instructional selection algorithm to select informative instructions for performance improvement for the key stage of the activity corresponding with the key frame and skeletal map. The instructional data may be transmitted to a mobile device for display on a display device.

Figure 2:
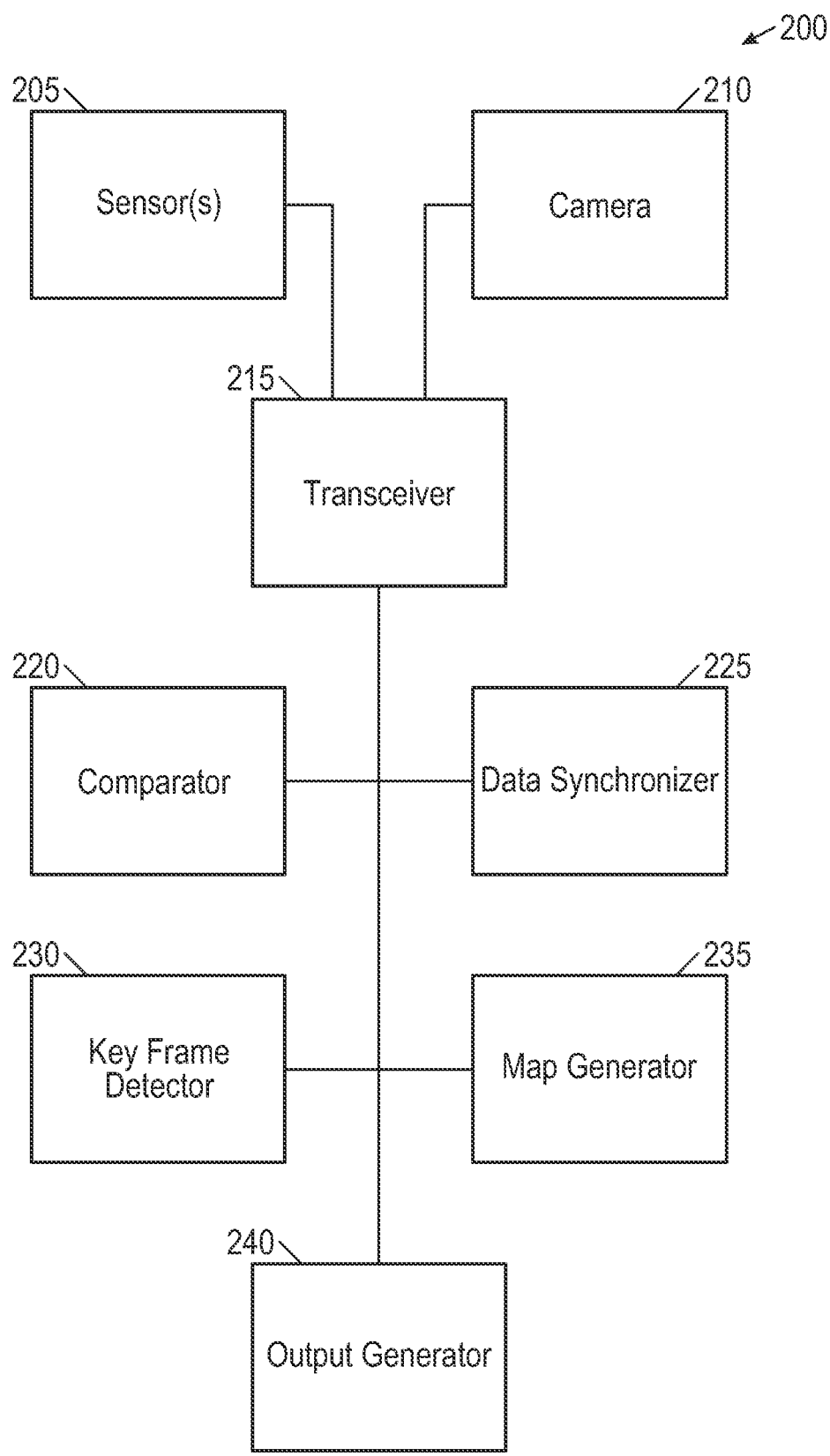
FIG. 2 is a block diagram of an example of a positional analysis engine for positional analysis using computer vision sensor synchronization, according to an embodiment.

FIG. 2 is a block diagram of an example of the positional analysis engine 200 for positional analysis using computer vision sensor synchronization, according to an embodiment. The positional analysis engine 200 may include a variety of components such as transceiver 215, map generator 235, key frame detector 230, data synchronizer 225, comparator 220, and output generator 240. The components of the positional analysis engine 200 may be implemented in a single computing device (e.g., smartphone, tablet, desktop computer, laptop computer, etc.) or implemented across multiple computing devices (e.g., cloud based computing system, virtual computing system, etc.). The sensor(s) 205 and the camera 210, while not directly a part of the positional analysis engine 200, are communicatively coupled (e.g., via wireless network, wired network, shared bus, radio transmission, etc.) to the positional analysis engine 200 via transceiver 215.

The sensor(s) 205 may include a variety of sensor devices such as, for example, an accelerometer, gyroscope, global positioning receiver, magnetometer, etc. The sensor(s) 205 may be included in a wearable device such as the smart shirt 110 as described in FIG. 1. The sensor(s) 205 may collect a set of sensor data describing movement of a participant of an activity. For example, the smart shirt have an array of three sensors positioned such that the sensors are able to collect data describing movement for various regions of the participant's body during a baseball swing. In an example, the set of sensor data may include accelerometer and gyroscope data. The sensor(s) 205 may be paired with a mobile device (e.g., smartphone, tablet, etc.) to receive and process the sensor data.

The camera 210 may be included in the mobile device and may capture a video stream of the participant engaging in the activity. For example, the camera 210 may be positioned on a tripod facing the baseball player to capture the baseball player's body during the baseball swing. In some examples, the camera 210 may capture the video stream on the fly and may store the video/images in a temporary cyclic buffer. The video stream may include images of the participant engaging in the activity. For example, the video stream may contain images of the baseball player's body while swinging at a baseball.

The transceiver 215 may process incoming and outgoing data. The transceiver 215 may obtain a set of sensor data from the sensor(s) 205 for a particular activity. For example, the transceiver 215 may obtain a set of sensor data from the sensor array 205 of the smart shirt worn by the baseball player as the player starts a baseball swing. The transceiver 215 may receive the video stream from the camera 210. The transceiver 215 may forward the sensor data and the video stream to other components of the positional analysis engine 200 such as the map generator 220, key frame detector 225, the data synchronizer 230, and the comparator 235. The transceiver 215 may receive and process output data from components of the positional analysis engine 200 such as the output generator 240.

The comparator 220 may analyze the set of sensor data collected from the sensor(s) 205 to identify a start of the activity. For example, a baseball swing may be identified if the g-force observed by an accelerometer exceeds 7G or other using other data analysis techniques based on the accelerometer and gyroscope data. In some examples, the comparator 220 may transmit a signal to the camera 210 to begin capturing the video stream upon detecting the start of the activity. The comparator 220 may evaluate the set of sensor data to determine key stages of the activity. For example, a baseball swing may be comprised of six key stages including stance, timing, hitting, rotation, contact, and extension. The sensor data may be evaluated using a variety of data analysis techniques to identify the key stages between the start and end of the activity. In an example, the set of sensor data is evaluated between the start and end of the activity to determine when features (e.g., acceleration, rotation, etc.) extracted from the set of sensor data match a set of reference features matching the key stage of the activity. For example, training sensor data of previous baseball swings may be labeled with the key stage to establish accelerometer ranges corresponding to the key stage and the baseball player's set of sensor data may be evaluated to identify when an accelerometer value in the set of sensor data is in the range corresponding to the key stage.

The comparator 220 may determine a timestamp corresponding to the portion of the set of sensor data used to identify the key stage. The comparator 220 may forward the timestamp to the data synchronizer 225 to synchronize the set of sensor data and the video stream. The data synchronizer 225 may use the timestamp to align the sensor data to the video stream. The data synchronizer 225 may align the sensor data by matching the timestamps in the set of sensor data to the timestamps in the video stream. Additionally or alternatively, the data synchronizer 225 may generate a time offset using the timestamp from the set of sensor data and may apply the time offset to the video stream to align the set of sensor data and the video stream. In an example, the camera 210 may compose a new video stream based on the relative timestamp between the sensor and the mobile device. For example, the video stream may be 1 to 3 seconds in length.

The key frame detector 230 may work in conjunction with the data synchronizer 225 to select a key frame from the video stream using the timestamp of the sensor data used in identifying the key stage of the activity. For example, the key frame detector 230 may use the timestamp or the time offset to select an image of the baseball player during the stance stage of the baseball swing from the video stream. In an example, an image is selected from the video stream as the key frame based on the timestamp of the set of sensor data used in identifying the key stage of the activity matching an image timestamp of the image from the video stream.

The key frame detector 230 may work in conjunction with the output generator 240 to provide the user with an opportunity to adjust the key frame for increased accuracy. The key frame including a representation of a reference position zone (e.g., an overlay representing a positional range of a human body at the key stage, etc.) corresponding to the key stage of the activity may be generated for output on a display device of a mobile device of the participant. In an example, the reference position zone may be generated using a model for the key stage of the activity. For example, the model may include upper and lower ranges for images of individuals engaged in the activity labeled as corresponding with the key stage and the reference position zone may be created by generating an overlay spanning the distance between the upper and the lower ranges of the images of the individuals engaged in the activity. The generated key frame including the representation of the reference zone position and a set of frames having timestamps between a start timestamp of the activity and an end timestamp for the activity may be transmitted (e.g., by the transceiver 215) for display on the display device. An input may be received indicating that a new frame has been selected for the key stage, and the new frame may be selected as the key frame. For example, the baseball player may be presented a display of the selected key frame with an overlay of a position of a model player at the key stage. The user may be able to scroll forward and backward through frames of the video stream and may select a frame the player feels is a better match to the position overlay. The frame selected by the player may then be used as the key frame for the key stage.

The map generator 235 may operate in conjunction with the comparator 220 to generate a skeletal map for the participant in the key frame using key points of the participant extracted from the key frame. The key points (e.g., pixels of the image, coordinates of objects identified in the image, etc.) may be identified using various computer vision techniques (e.g., pose estimation, landmark detection, etc.) and various machine learning techniques (e.g., deep learning, supervised machine learning, unsupervised machine learning, etc.). For example, images of previous baseball swings may be analyzed and labeled with key points (e.g., landmarks, etc.) to generate a human model corresponding to a baseball swing including joint locations such as, for example, head, neck, shoulder, elbow, wrist, hip, knee, ankle, etc.

The key frame may be evaluated against the model using deep learning techniques (e.g., layers of nonlinear processing, neural networks, etc.) non-deep learning techniques to estimate joint locations of the baseball player in the key frame. In an example, the key points may be evaluated using a machine learning model to identify estimated joint locations of the participant and the joint locations may be used by the map generator 235 to generate the skeletal map for the participant.

In some examples, the map generator 235 may operate in conjunction with the output generator 240 to provide the participant with an opportunity to adjust the joint locations for increased accuracy. The key frame including a representation of the skeletal map for the participant at the key stage of the activity including the estimated joints may be generated for output on a display device of the participant. An input indicating an adjustment to an estimated joint location of the estimated joint locations may be received from the mobile device of the participant. A new skeletal map may be generated for the participant at the key stage of the activity. For example, the baseball player may be presented with an image of the key frame for the baseball swing along with the skeletal map including joint locations. The baseball player may move an elbow joint to a new location based to better represent the player's actual physiology. A new skeletal map may be generated to accommodate the player's adjustment.

The output generator 240 may select instructional data using the skeletal map. The instructional data may include text, images, etc. that may be used by the participant to improve performance of the activity. Biometric information data may be estimated through computing angle, distance etc. between joints in the skeletal map in the key frame. The data may be analyzed using a set of rules (e.g., if-then, decision tree, etc.) to select the instructional data. For example, the baseball player may be dropping the leading elbow during the timing stage of the baseball swing and text and an image may be presented to the baseball player to keep the leading elbow up during the timing stage of the swing. In an example, an angle and a distance may be calculated between points (e.g., joints, etc.) in the skeletal map, the angle and distance may be evaluated using a set of rules, and the instructional data may be selected based on the evaluation. The output generator 240 may transmit the instructional data to the transceiver 215 for transmission to and display on a display device of the mobile device.

Figure 3:
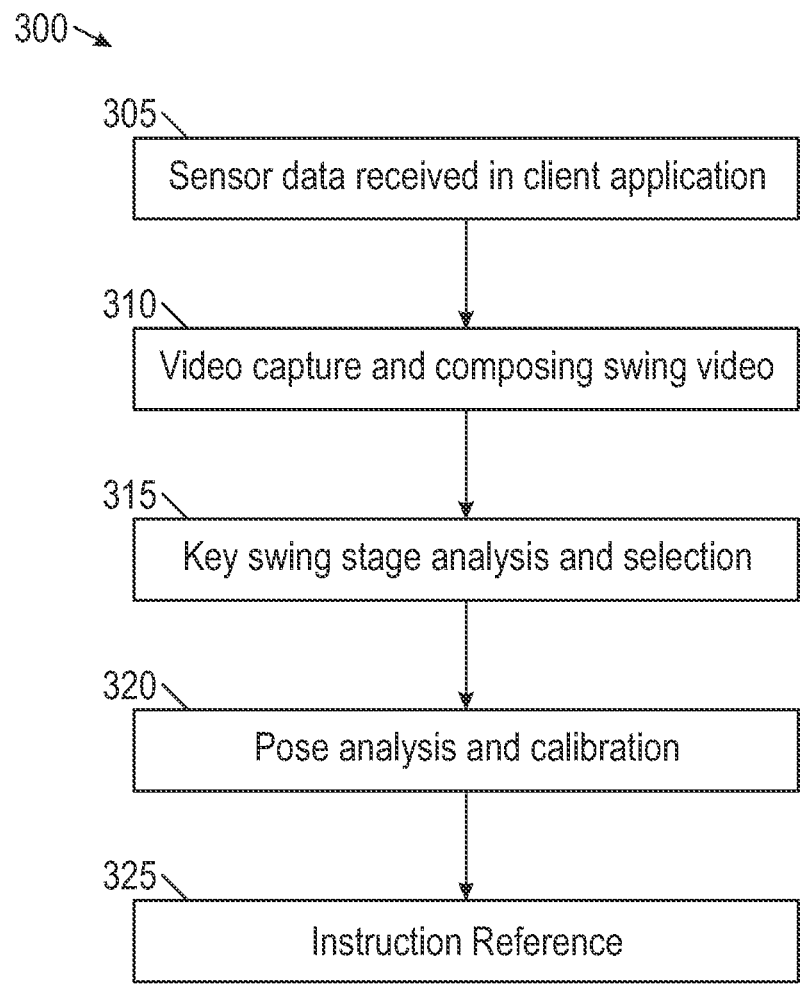
FIG. 3 is a flow diagram of a process for positional analysis using computer vision sensor synchronization, according to an embodiment.

FIG. 3 is a flow diagram of a process 300 for positional analysis using computer vision sensor synchronization, according to an embodiment. The process 300 may provide the functionality as described in FIG. 2.

At operation 305, sensor data may be received (e.g., using the transceiver 215 as described in FIG. 2) in a client application (e.g., the positional analysis engine 200, etc.). For example, a smart shirt may have several sensors located in three regions to acquire accelerometer and gyroscope data. The smart shirt and/or sensors may be paired (e.g., Bluetooth, etc.) with a mobile device using a pairing application. When a swing is detected (e.g., accelerometer data exceeds 7G, etc.), the sensor data may be transmitted to the client application.

At operation 310, a video may be captured and a swing (e.g., baseball swing, etc.) video may be composed. For example, a camera in the mobile device may capture the video on the fly and may store the video/images in a temporary cyclic buffer. Upon receiving the signal from the sensor (e.g., at operation 305) indicating that a swing is detected by the sensor, the client application may compose a new swing video clip based on the relative timestamp between the sensor and mobile device. Normally, a swing video clip ranges from one to three seconds.

Figure 4:
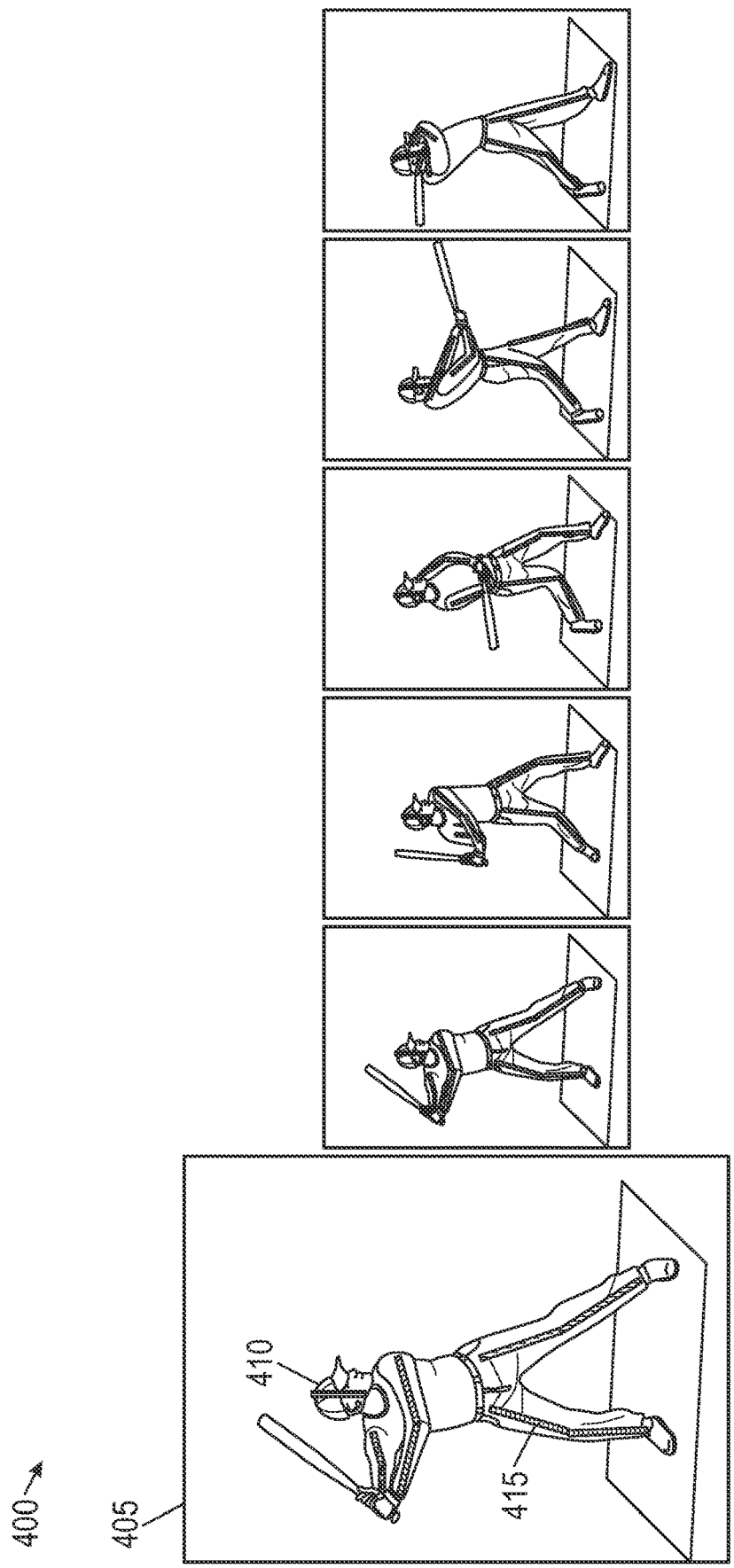
FIG. 4 illustrates an example of key frames for positional analysis using computer vision sensor synchronization, according to an embodiment.
Figure 5:
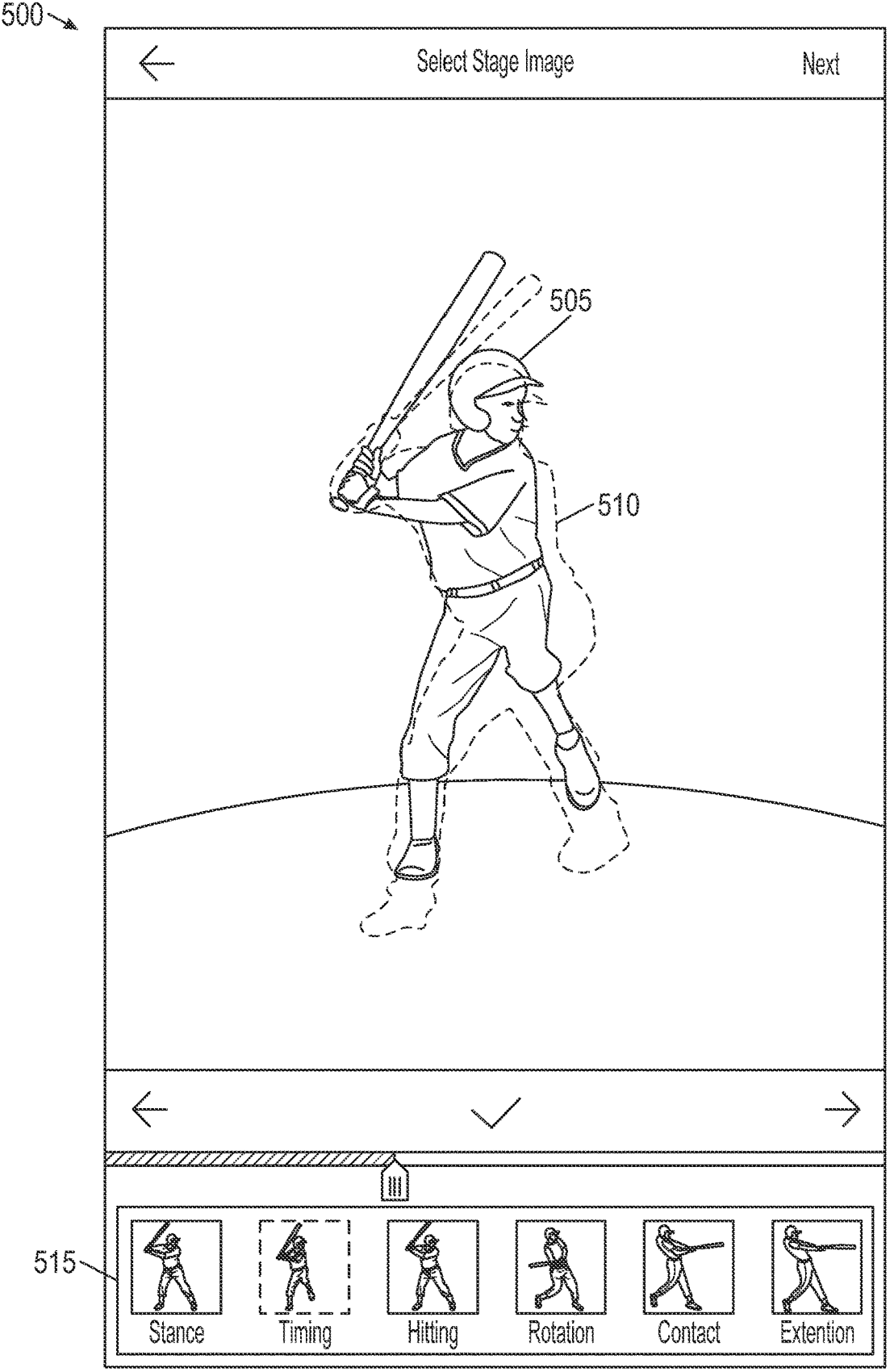
FIG. 5 illustrates an example of a user interface for key frame adjustment for positional analysis using computer vision sensor synchronization, according to an embodiment.

At operation 315, the sensor data is analyzed to identify and select a key swing stage. For example, a baseball swing may include six key swing stages—stance, timing, hitting, rotation, contact, and extension. Given a recorded video, frames representing each key swing stage are selected (e.g., as shown in FIG. 4). The start and end time point of a swing may be located using sensor data analysis (e.g., determining an accelerator value greater than 2G, etc.). The start and end time in the video may be inferred using timestamp correspondence between the sensor data and the video. The corresponding image for each swing stage may be selected a displayed on the screen of the mobile device. A user of the mobile device may adjust and confirm the key stage frames with some guidance from the frames (e.g., as shown in FIG. 5).

Figure 6:
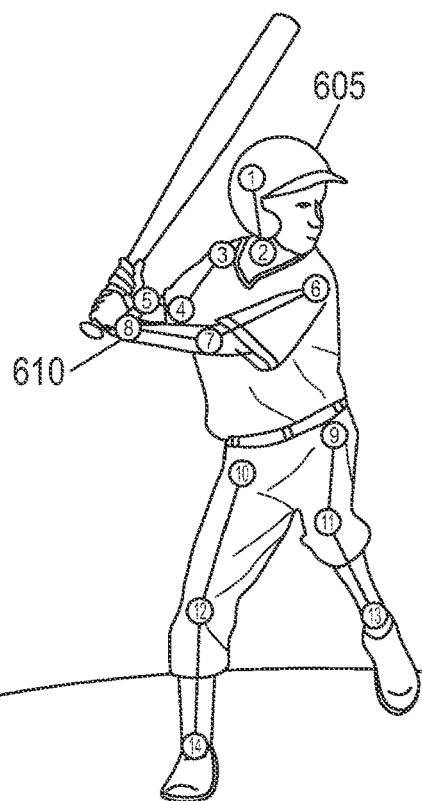
FIG. 6 illustrates an example of a user interface for skeletal map adjustment for positional analysis using computer vision sensor synchronization, according to an embodiment.

At operation 320, pose analysis and calibration is completed. For example, after the key stage images are selected, they may be uploaded to the cloud for pose analysis. In the pose analysis algorithm, fourteen joints including head, arm, and leg may be estimated using a deep learning based algorithm. After analysis in the cloud, the joints data may be returned back to the client application. The user may be allowed to manually calibrate and confirm the joint position (e.g., as shown in FIG. 6).

At operation 325, training reference instructions may be selected. For example, given the joints information located in the arm and legs for each stage image, biometrics data may be estimated through computing the angle, distance, etc. for each stage. The data may be fed into a rule based expert system and informative instructions may be summarized for training performance improvement.

FIG. 4 illustrates an example of key frames 400 for positional analysis using computer vision sensor synchronization, according to an embodiment. The key frames 400 may be identified by the key frame detector 230 as described in FIG. 2. The key frames 400 may include individual key frames for each key stage of an activity (e.g., baseball, etc.) such as key frame 405. The key frame 405 may include a participant 410. The techniques described in FIG. 2 may be used to construct a skeletal map 415 for the user that may be used to select instructional information relevant to the key stage that the participant 410 may use to increase performance in the activity.

FIG. 5 illustrates an example of a user interface 500 for key frame adjustment for positional analysis using computer vision sensor synchronization, according to an embodiment. The user interface 500 may include a key frame including a participant 505 and a positional reference zone 510. The key frame may correspond to a key stage 515 of an activity. The user interface 500 may be used to obtain feedback regarding the automatic selection of the key frame (e.g., as described in FIG. 2). The user interface 500 may be implemented on a mobile device (e.g., smartphone, tablet, etc.) and may allow a user of the mobile device to scroll forward and backward through frames of a video clip of the participant 505 engaging in the activity. The user interface 500 may allow the user to select an alternative frame as the key frame. The user may be able to select different key stages 515 to select a new key frame or confirm the automatically selected key frame. The inputs received by the mobile device may be used to update the key frame for each of the key stages 515 as described in FIG. 2.

FIG. 6 illustrates an example of a user interface 600 for skeletal map adjustment for positional analysis using computer vision sensor synchronization, according to an embodiment. The user interface 600 may include a key frame including a participant 605 and may include a skeletal map including estimated joint locations 610 of the participant 605. The key frame may be associated with one of several key stages 615 of an activity (e.g., a baseball swing, etc.). The user interface 600 may be implemented on a mobile device (e.g., smartphone, tablet, etc.) allowing the user to adjust or confirm estimated joint locations 610 that have been automatically estimated (e.g., by the map generator 235 as described in FIG. 2). A user may be able to interact (e.g., drag, etc.) with the joint locations 610 to make adjustments to the placement of the joint locations to match the physiology of the participant 605. The user may be able to select each kay stage of the key stages 615 to adjust or confirm the joint location of the skeletal map corresponding to each key stage. The inputs received from the mobile device may be used to generate a new skeletal map for a key stage and/or key frame. The new skeletal map may be used to select instructional data as described in FIG. 2.

Figure 7:
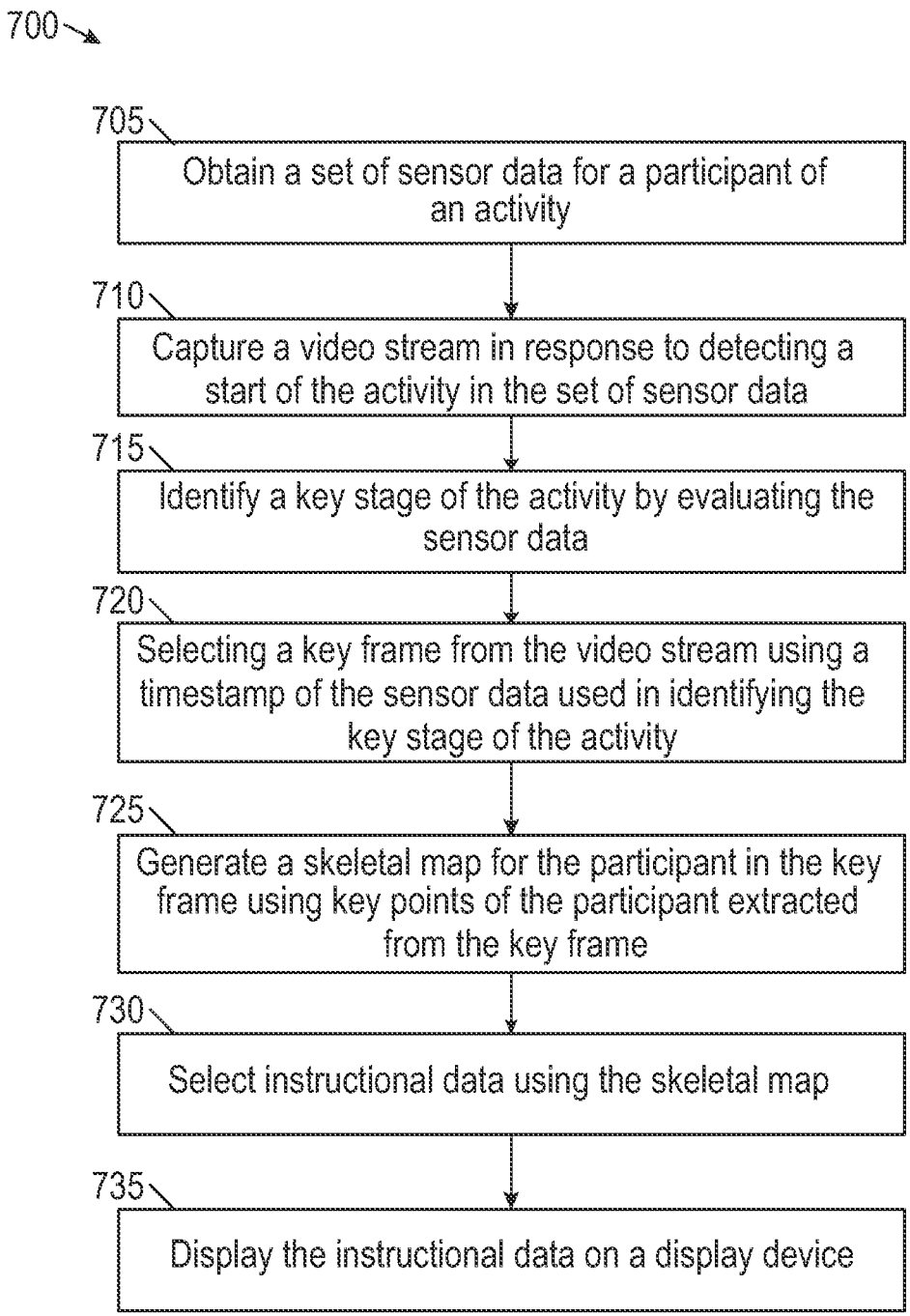
FIG. 7 illustrates an example of a method for positional analysis using computer vision sensor synchronization, according to an embodiment.

FIG. 7 illustrates an example of a method 700 for positional analysis using computer vision sensor synchronization, according to an embodiment. The method 700 may provide functionality as described in FIG. 2.

At operation 705, a set of sensor data may be obtained for a participant of an activity. In an example, the set of sensor data may include accelerometer data and gyroscope data. In some examples, the set of sensor data may be obtained from a sensor array included in a smart shirt worn by the participant. In an example, the sensor array may include an accelerometer and a gyroscope.

At operation 710, a video stream may be captured in response to detecting a start of the activity in the set of sensor data. The video stream may include images of the participant engaging in the activity. In an example, the video stream may be captured from an image capture device included in a mobile device.

At operation 715, a key stage of the activity may be identified by evaluating the sensor data. In an example, the set of sensor data collected between the start of the activity and an end of the activity may be evaluated to determine when features extracted from the set of sensor data match a set of reference features corresponding to the key stage of the activity.

At operation 720, a key frame may be selected from the video stream using a timestamp of the sensor data used in identifying the key stage of the activity. In an example, an image may be selected from the video stream as the key frame based on the timestamp of the set of sensor data used in identifying the key stage of the activity matching an image timestamp of the image from the video stream.

At operation 725, a skeletal map may be generated for the participant in the key frame using key points of the participant extracted from the skeletal map. In an example, the skeletal map includes a set of estimated joint locations of the participant. In an example, the key points may be evaluated using a machine learning model to identify estimated joint locations of the participant and the skeletal map may be generated using the estimated joint locations.

At operation 730, instructional data may be selected using the skeletal map. In an example, an angle and a distance may be calculated between points in the skeletal map. The angle and the distance may be evaluated using a set of rules and the instructional data may be selected based on the evaluation. At operation 735, the instructional data is displayed on a display device.

In some examples, the key frame including a representation of a reference position and a set of frames having timestamps between a start timestamp of the activity and an end timestamp of the activity may be generated for output on a display device of a mobile device. The generated key frame including the representation of the reference position zone and a set of frames having timestamps between a start timestamp of the activity and an end timestamp of the activity may be transmitted for display on the display device of the mobile device. An input indicating that a new frame has been selected for the key stage may be received from the mobile device and the new frame may be selected as the key frame.

In some examples, the key frame including a representation of the skeletal map for the participant at the key stage of the activity including the estimated joint locations may be generated for output on a display device of a mobile device. An input indicating an adjustment to an estimated joint location of the estimated joint locations on the skeletal map may be received from the mobile device and a new skeletal map may be generated for the participant at the key stage of the activity using the input. The instructional data may be selected using the new skeletal map.

Figure 8:
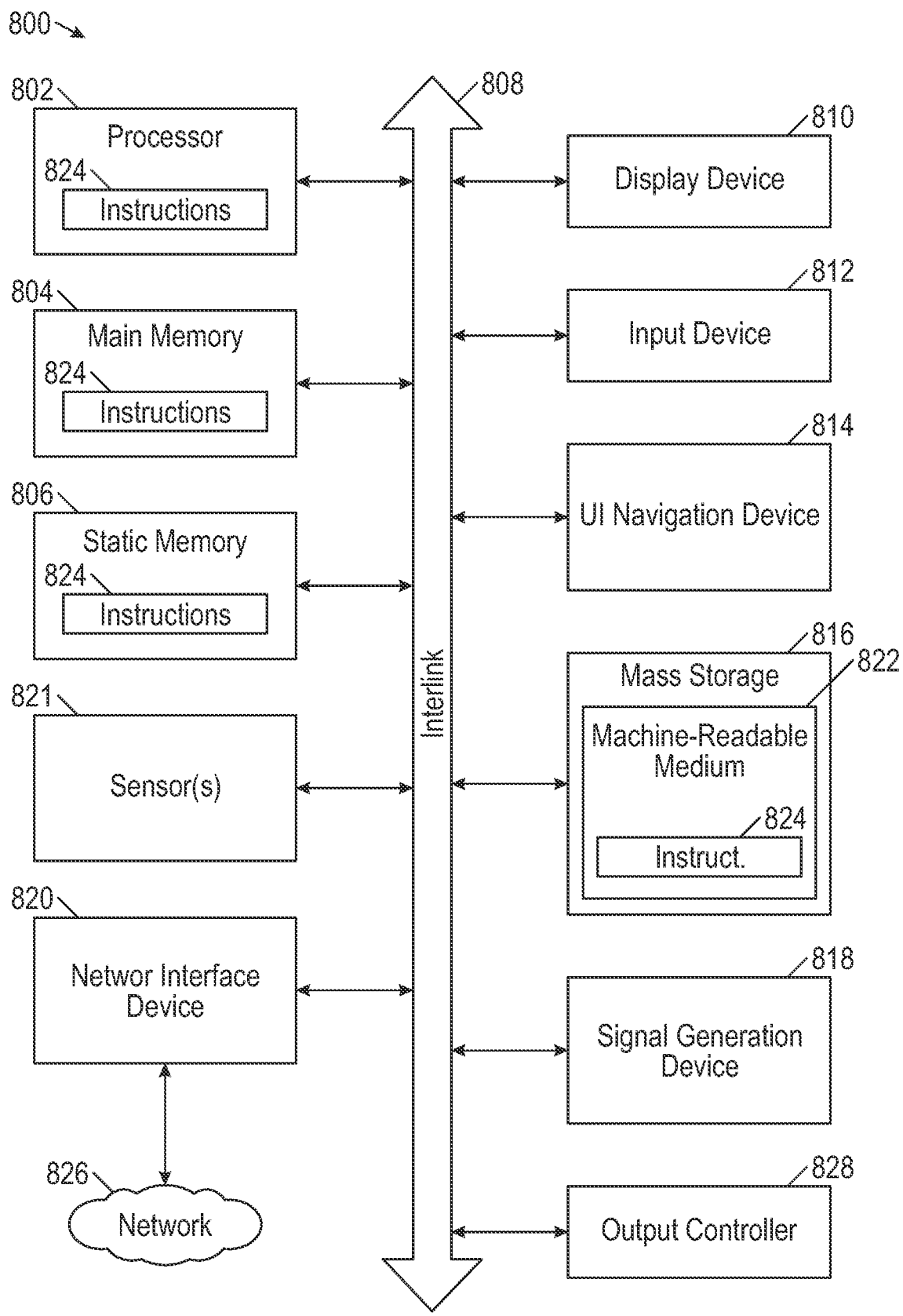
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 is a system for providing instructional data for a participant of an activity, the system comprising: at least one processor; and memory including instructions that, when executed by the at least one processor, cause the at least one processor to: obtain sensor data for the participant of the activity; initiate capture of a video stream in response to detecting a start of the activity in the sensor data, the video stream including images of the participant engaging in the activity; identify a key stage of the activity by evaluation of the sensor data; select a key frame from the video stream using a timestamp of the sensor data used to identify the key stage of the activity; generate a skeletal map for the participant in the key frame using key points of the participant extracted from the key frame, wherein the key points define portions of a body of the participant during the activity; select the instructional data using the skeletal map; and display the instructional data on a display device.

In Example 2, the subject matter of Example 1 optionally includes wherein the sensor data includes accelerometer and gyroscope data.

In Example 3, the subject matter of any one or more of Examples 1-2 optionally include wherein the video stream is captured from an image capture device included in a mobile computing device.

In Example 4, the subject matter of Example 3 optionally includes a communication interface, wherein the video stream is received using the communication interface.

In Example 5, the subject matter of any one or more of Examples 1-4 optionally include wherein the skeletal map includes a set of estimated joint locations of the participant corresponding to the key points.

In Example 6, the subject matter of any one or more of Examples 1-5 optionally include the operations to determine the key stage further comprising operations to: evaluate the sensor data collected between the start of the activity and an end of the activity to determine when features extracted from the sensor data match a set of reference features corresponding to the key stage of the activity.

In Example 7, the subject matter of any one or more of Examples 1-6 optionally include the operations to select the key frame using the timestamp of the sensor data used to identify the key stage of the activity further comprising operations to: select an image from the video stream as the key image based on the sensor data used to identify the key stage of the activity having a timestamp that matches an image timestamp of the image from the video stream.

In Example 8, the subject matter of any one or more of Examples 1-7 optionally include operations to: generate, for output on a display device of a mobile device of the participant, the key frame including a representation of a reference position zone corresponding to the key stage of the activity; transmit, for display on the display device of the mobile device, the generated key frame including the representation of the reference position zone and a set of frames having timestamps between a start timestamp of the activity and an end timestamp of the activity; receive, from the mobile device, an input that indicates that a new frame has been selected for the key stage; and select the new frame as the key frame.

In Example 9, the subject matter of Example 8 optionally includes wherein the reference position zone is generated using a model for the key stage of the activity.

In Example 10, the subject matter of any one or more of Examples 1-9 optionally include the operations to generate the skeletal map for the participant in the key frame using key points of the participant extracted from the key frame further comprising operations to: evaluate the key points using a machine learning model to identify estimated joint locations of the participant; and generate the skeletal map using the estimated joint locations.

In Example 11, the subject matter of Example 10 optionally includes operations to: generate, for output on a display device of a mobile device, the key frame including a representation of the skeletal map for the participant at the key stage of the activity including the estimated joint locations; receive, from the mobile device, an input that indicates an adjustment to an estimated joint location of the estimated joint locations on the skeletal map; and generate a new skeletal map for the participant at the key stage of the activity using the input, wherein the selection of the instructional data uses the new skeletal map.

In Example 12, the subject matter of any one or more of Examples 1-11 optionally include the operations to select the instructional data using the skeletal map further comprising operations to: calculate an angle and a distance between points in the skeletal map; evaluate the angle and the distance using a set of rules; and select the instructional data based on the evaluation.

In Example 13, the subject matter of any one or more of Examples 1-12 optionally include a sensor array, wherein the sensor data is obtained from the sensor array.

In Example 14, the subject matter of Example 13 optionally includes wherein the sensor array is included in a smart shirt worn by the participant.

In Example 15, the subject matter of any one or more of Examples 13-14 optionally include wherein the sensor array includes an accelerometer and a gyroscope.

In Example 16, the subject matter of any one or more of Examples 1-15 optionally include a camera, wherein the video steam is captured by the camera.

In Example 17, the subject matter of any one or more of Examples 1-16 optionally include wherein the instructional data is displayed on a display device of a mobile computing device.

In Example 18, the subject matter of Example 17 optionally includes a communication interface, wherein the instructional data is transmitted to the mobile computing device using the communication interface.

Example 19 is at least one machine readable medium including instructions for providing instructional data for a participant of an activity that, when executed by a machine, cause the machine to perform operations to: obtain sensor data for the participant of the activity; initiate capture of a video stream in response to detecting a start of the activity in the sensor data, the video stream including images of the participant engaging in the activity; identify a key stage of the activity by evaluation of the sensor data; select a key frame from the video stream using a timestamp of the sensor data used to identify the key stage of the activity; generate a skeletal map for the participant in the key frame using key points of the participant extracted from the key frame, wherein the key points define portions of a body of the participant during the activity; select the instructional data using the skeletal map; and display the instructional data on a display device.

In Example 20, the subject matter of Example 19 optionally includes wherein the sensor data includes accelerometer and gyroscope data.

In Example 21, the subject matter of any one or more of Examples 19-20 optionally include wherein the video stream is captured from an image capture device included in a mobile computing device.

In Example 22, the subject matter of any one or more of Examples 19-21 optionally include wherein the skeletal map includes a set of estimated joint locations of the participant corresponding to the key points.

In Example 23, the subject matter of any one or more of Examples 19-22 optionally include the operations to determine the key stage further comprising operations to: evaluate the sensor data collected between the start of the activity and an end of the activity to determine when features extracted from the sensor data match a set of reference features corresponding to the key stage of the activity.

In Example 24, the subject matter of any one or more of Examples 19-23 optionally include the operations to select the key frame using the timestamp of the sensor data used to identify the key stage of the activity further comprising operations to: select an image from the video stream as the key image based on the sensor data used to identify the key stage of the activity having a timestamp that matches an image timestamp of the image from the video stream.

In Example 25, the subject matter of any one or more of Examples 19-24 optionally include operations to: generate, for output on a display device of a mobile device of the participant, the key frame including a representation of a reference position zone corresponding to the key stage of the activity; transmit, for display on the display device of the mobile device, the generated key frame including the representation of the reference position zone and a set of frames having timestamps between a start timestamp of the activity and an end timestamp of the activity; receive, from the mobile device, an input that indicates that a new frame has been selected for the key stage; and select the new frame as the key frame.

In Example 26, the subject matter of Example 25 optionally includes wherein the reference position zone is generated using a model for the key stage of the activity.

In Example 27, the subject matter of any one or more of Examples 19-26 optionally include the operations to generate the skeletal map for the participant in the key frame using key points of the participant extracted from the key frame further comprising operations to: evaluate the key points using a machine learning model to identify estimated joint locations of the participant; and generate the skeletal map using the estimated joint locations.

In Example 28, the subject matter of Example 27 optionally includes operations to: generate, for output on a display device of a mobile device, the key frame including a representation of the skeletal map for the participant at the key stage of the activity including the estimated joint locations; receive, from the mobile device, an input that indicates an adjustment to an estimated joint location of the estimated joint locations on the skeletal map; and generate a new skeletal map for the participant at the key stage of the activity using the input, wherein the selection of the instructional data uses the new skeletal map.

In Example 29, the subject matter of any one or more of Examples 19-28 optionally include the operations to select the instructional data using the skeletal map further comprising operations to: calculate an angle and a distance between points in the skeletal map; evaluate the angle and the distance using a set of rules; and select the instructional data based on the evaluation.

In Example 30, the subject matter of any one or more of Examples 19-29 optionally include wherein the sensor data is obtained from a sensor array included in a smart shirt worn by the participant.

In Example 31, the subject matter of Example 30 optionally includes wherein the sensor array includes an accelerometer and a gyroscope.

Example 32 is a method for providing instructional data for a participant of an activity, the method comprising: obtaining sensor data for the participant of the activity; initiating capture of a video stream in response to detecting a start of the activity in the sensor data, the video stream including images of the participant engaging in the activity; identifying a key stage of the activity by evaluating the sensor data; selecting a key frame from the video stream using a timestamp of the sensor data used in identifying the key stage of the activity; generating a skeletal map for the participant in the key frame using key points of the participant extracted from the key frame, wherein the key points define portions of a body of the participant during the activity; selecting the instructional data using the skeletal map; and displaying the instructional data on a display device.

In Example 33, the subject matter of Example 32 optionally includes wherein the sensor data includes accelerometer and gyroscope data.

In Example 34, the subject matter of any one or more of Examples 32-33 optionally include wherein the video stream is captured from an image capture device included in a mobile computing device.

In Example 35, the subject matter of any one or more of Examples 32-34 optionally include wherein the skeletal map includes a set of estimated joint locations of the participant corresponding to the key points.

In Example 36, the subject matter of any one or more of Examples 32-35 optionally include wherein determining the key stage further comprises: evaluating the sensor data collected between the start of the activity and an end of the activity to determine when features extracted from the sensor data match a set of reference features corresponding to the key stage of the activity.

In Example 37, the subject matter of any one or more of Examples 32-36 optionally include wherein selecting the key frame using the timestamp of the sensor data used in identifying the key stage of the activity further comprises: selecting an image from the video stream as the key image based on the timestamp of the sensor data used in identifying the key stage of the activity matching an image timestamp of the image from the video stream.

In Example 38, the subject matter of any one or more of Examples 32-37 optionally include generating, for output on a display device of a mobile device of the participant, the key frame including a representation of a reference position zone corresponding to the key stage of the activity; transmitting, for display on the display device of the mobile device, the generated key frame including the representation of the reference position zone and a set of frames having timestamps between a start timestamp of the activity and an end timestamp of the activity; receiving, from the mobile device, an input indicating that a new frame has been selected for the key stage; and selecting the new frame as the key frame.

In Example 39, the subject matter of Example 38 optionally includes wherein the reference position zone is generated using a model for the key stage of the activity.

In Example 40, the subject matter of any one or more of Examples 32-39 optionally include wherein generating the skeletal map for the participant in the key frame using key points of the participant extracted from the key frame further comprises: evaluating the key points using a machine learning model to identify estimated joint locations of the participant; and generating the skeletal map using the estimated joint locations.

In Example 41, the subject matter of Example 40 optionally includes generating, for output on a display device of a mobile device, the key frame including a representation of the skeletal map for the participant at the key stage of the activity including the estimated joint locations; receiving, from the mobile device, an input indicating an adjustment to an estimated joint location of the estimated joint locations on the skeletal map; and generating a new skeletal map for the participant at the key stage of the activity using the input, wherein the instructional data is selected using the new skeletal map.

In Example 42, the subject matter of any one or more of Examples 32-41 optionally include wherein selecting the instructional data using the skeletal map further comprises: calculating an angle and a distance between points in the skeletal map; evaluating the angle and the distance using a set of rules; and selecting the instructional data based on the evaluating.

In Example 43, the subject matter of any one or more of Examples 32-42 optionally include wherein the sensor data is obtained from a sensor array included in a smart shirt worn by the participant.

In Example 44, the subject matter of Example 43 optionally includes wherein the sensor array includes an accelerometer and a gyroscope.

Example 45 is a system to implement providing instructional data for a participant of an activity, the system comprising means to perform any method of Examples 32-44.

Example 46 is at least one machine readable medium to implement providing instructional data for a participant of an activity, the at least one machine readable medium including instructions that, when executed by a machine, cause the machine to perform any method of Examples 32-44.

Example 47 is a system for providing instructional data for a participant of an activity, the system comprising: means for obtaining sensor data for the participant of the activity; means for initiating capture of a video stream in response to detecting a start of the activity in the sensor data, the video stream including images of the participant engaging in the activity; means for identifying a key stage of the activity by evaluating the sensor data; means for selecting a key frame from the video stream using a timestamp of the sensor data used in identifying the key stage of the activity; means for generating a skeletal map for the participant in the key frame using key points of the participant extracted from the key frame, wherein the key points define portions of a body of the participant during the activity; means for selecting the instructional data using the skeletal map; and means for displaying the instructional data on a display device.

In Example 48, the subject matter of Example 47 optionally includes wherein the sensor data includes accelerometer and gyroscope data.

In Example 49, the subject matter of any one or more of Examples 47-48 optionally include wherein the video stream is captured from an image capture device included in a mobile computing device.

In Example 50, the subject matter of any one or more of Examples 47-49 optionally include wherein the skeletal map includes a set of estimated joint locations of the participant corresponding to the key points.

In Example 51, the subject matter of any one or more of Examples 47-50 optionally include wherein determining the key stage further comprises: means for evaluating the sensor data collected between the start of the activity and an end of the activity to determine when features extracted from the sensor data match a set of reference features corresponding to the key stage of the activity.

In Example 52, the subject matter of any one or more of Examples 47-51 optionally include wherein selecting the key frame using the timestamp of the sensor data used in identifying the key stage of the activity further comprises: means for selecting an image from the video stream as the key image based on the timestamp of the sensor data used in identifying the key stage of the activity matching an image timestamp of the image from the video stream.

In Example 53, the subject matter of any one or more of Examples 47-52 optionally include means for generating, for output on a display device of a mobile device of the participant, the key frame including a representation of a reference position zone corresponding to the key stage of the activity; means for transmitting, for display on the display device of the mobile device, the generated key frame including the representation of the reference position zone and a set of frames having timestamps between a start timestamp of the activity and an end timestamp of the activity; means for receiving, from the mobile device, an input indicating that a new frame has been selected for the key stage; and means for selecting the new frame as the key frame.

In Example 54, the subject matter of Example 53 optionally includes wherein the reference position zone is generated using a model for the key stage of the activity.

In Example 55, the subject matter of any one or more of Examples 47-54 optionally include wherein generating the skeletal map for the participant in the key frame using key points of the participant extracted from the key frame further comprises: means for evaluating the key points using a machine learning model to identify estimated joint locations of the participant; and means for generating the skeletal map using the estimated joint locations.

In Example 56, the subject matter of Example 55 optionally includes means for generating, for output on a display device of a mobile device, the key frame including a representation of the skeletal map for the participant at the key stage of the activity including the estimated joint locations; means for receiving, from the mobile device, an input indicating an adjustment to an estimated joint location of the estimated joint locations on the skeletal map; and means for generating a new skeletal map for the participant at the key stage of the activity using the input, wherein the instructional data is selected using the new skeletal map.

In Example 57, the subject matter of any one or more of Examples 47-56 optionally include wherein selecting the instructional data using the skeletal map further comprises: means for calculating an angle and a distance between points in the skeletal map; means for evaluating the angle and the distance using a set of rules; and means for selecting the instructional data based on the evaluating.

In Example 58, the subject matter of any one or more of Examples 47-57 optionally include wherein the sensor data is obtained from a sensor array included in a smart shirt worn by the participant.

In Example 59, the subject matter of Example 58 optionally includes wherein the sensor array includes an accelerometer and a gyroscope.

Example 60 is a system comprising means for performing the operations of any one or more of examples 1-59.

Example 61 is a non-transitory machine readable medium including instructions that, when executed by a machine cause the machine to perform the operations of any one or more of examples 1-59.

Example 62 is a system configured to perform operations of any one or more of examples 1-59.

Example 63 is a method for performing operations of any one or more of examples 1-59.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for use by a participant of an activity, the system comprising:
at least one processor; and
memory including instructions that, when executed by the at least one processor, cause the at least one processor to:
access a video stream that includes a recording of the activity performed by the participant;
generate a skeletal map for the participant in a key frame of the video stream using key points of the participant extracted from the key frame, wherein the key points define portions of a body of the participant during a key stage of the activity, the key stage identified using sensor data obtained from sensors that monitor the participant, wherein the key frame is determined to coincide with the key stage;
select the instructional data using the skeletal map; and
display the instructional data on a display device.

2. The system of claim 1, the instructions to identify the key stage further comprising instructions that cause the at least one processor to:
evaluate the sensor data collected between a start of the activity and an end of the activity to determine when features extracted from the sensor data match a set of reference features corresponding to the key stage of the activity.

3. The system of claim 1, the instructions to generate the skeletal map for the participant in the key frame using key points of the participant extracted from the key frame further comprising instructions that cause the at least one processor to:
evaluate the key points using a machine learning model to identify estimated joint locations of the participant; and
generate the skeletal map using the estimated joint locations.

4. The system of claim 3, further comprising instructions that cause the at least one processor to:
generate, for output on a display device of a mobile device, the key frame including a representation of the skeletal map for the participant at the key stage of the activity including the estimated joint locations;
receive, from the mobile device, an input that indicates an adjustment to an estimated joint location of the estimated joint locations on the skeletal map; and
generate a new skeletal map for the participant at the key stage of the activity using the input, wherein the selection of the instructional data uses the new skeletal map.

5. The system of claim 1, the instructions to select the instructional data using the skeletal map further comprising instructions that cause the at least one processor to:
calculate an angle and a distance between points in the skeletal map;
evaluate the angle and the distance using a set of rules; and
select the instructional data based on the evaluation.

6. The system of claim 1, further comprising a sensor array, wherein the sensor data. is obtained from the sensor array.

7. The system of claim 1, further comprising a camera, wherein the video stream is captured by the camera.

8. The system of claim 1, wherein the display device is integrated with a mobile computing device.

9. The system of claim 8, further comprising a communication interface, wherein the instructional data is transmitted to the mobile computing device using the communication interface.

10. At least one non-transitory machine-readable medium including instructions for providing data to a participant of an activity that, when executed by at least one processor, cause the at least one processor to perform operations to:
access a video stream that includes a recording of the activity performed by the participant;
generate a skeletal map for the participant in a key frame of the video stream using key points of the participant extracted from the key frame, wherein the key points define portions of a body of the participant during a key stage of the activity, the key stage identified using sensor data obtained from sensors that monitor the participant, wherein the key frame is determined to coincide with the key stage;
select the instructional data using the skeletal map; and
display the instructional data on a display device.

11. The at least one non-transitory machine-readable medium of claim 10, the instructions to identify the key stage further comprising instructions that cause the at least one processor to:
evaluate the sensor data collected between a start, of the activity and an end of the activity to determine when features extracted from the sensor data match a set of reference features corresponding to the key stage of the activity.

12. The at least one non-transitory machine-readable medium of claim 10, further comprising instructions that cause the at least one processor to:
generate, for output on a display device of a mobile device of the participant, the key frame including a representation of a reference position zone corresponding to the key stage of the activity;
transmit, for display on the display device of the mobile device, the generated key frame including the representation of the reference position zone and a set of frames having timestamps between a start, timestamp of the activity and an end timestamp of the activity;
receive, from the mobile device, an input that indicates that a new frame has been selected for the key stage; and
select the new frame as the key frame.

13. The at least one non-transitory machine-readable medium of claim 10, the instructions to generate the skeletal map for the participant in the key frame using key points of the participant extracted from the key frame further comprising instructions that cause the at least one processor to:
evaluate the key points using a machine learning model to identify estimated joint locations of the participant; and
generate the skeletal map using estimated joint locations.

14. The at least one non-transitory machine-readable medium of claim 13, further comprising instructions that cause the at least one processor to:

generate, for output on a display device of a mobile device, the key frame including a representation of the skeletal map for the participant at the key stage of the activity including the estimated joint locations;

receive, from the mobile device, an input that, indicates an adjustment to an estimated joint location of the estimated joint locations on the skeletal map; and generate a new skeletal map for the participant at the key stage of the activity using the input, wherein the selection of the instructional data uses the new skeletal map.

15. The at least one non-transitory machine-readable medium of claim 10, the instructions to select the instructional data using the skeletal map further comprising instructions that cause the at least one processor to:

calculate an angle and a distance between points in the skeletal map;

evaluate the angle and the distance using a set of rules; and select the instructional data based on the evaluation.

16. method for providing data to a participant of an activity, the method comprising:

accessing a video stream that includes a recording of the activity performed by the participant;

generating a skeletal map for the participant in a key frame of the video stream using key points of the participant extracted from the key frame, wherein the key points define portions of a body of the participant during a key stage of the activity, the key stage identified using sensor data obtained from sensors that monitor the participant, wherein the key frame is determined to coincide with the key stage;

selecting the instructional data using the skeletal map; and displaying the instructional data on a display device.

17. The method of claim 16, wherein identifying the key stage further comprises:

evaluating the sensor data collected between a start of the activity and an end of the activity to determine when features extracted from the sensor data match a set of reference features corresponding to the key stage of the activity.

18. The method of claim 16, further comprising:

generating, for output on a display device of a mobile device of the participant, the key frame including a representation of a reference position zone corresponding to the key stage of the activity;

transmitting, for display on the display device of the mobile device, the generated key frame including the representation of the reference position zone and a set of frames having timestamps between a start timestamp of the activity and an end timestamp of the activity;

receiving, from the mobile device, an input indicating that a new frame has been selected for he key stage; and selecting the new frame as the key frame.

19. The method of claim 16, wherein generating the skeletal map for the participant in the key frame using key points of the participant extracted from the key frame further comprises:

evaluating the key points using a machine learning model to identify estimated joint locations of the participant; and generating the skeletal map using the estimated joint locations.

20. The method of claim 19, further comprising:

generating, for output on a display device of a mobile device, the key frame including a representation of the skeletal map for the participant at the key stage of the activity including the estimated joint locations;

receiving, from the mobile device, an input indicating an adjustment o an estimated joint location of the estimated joint locations on the skeletal map; and generating a new skeletal map for the participant at the key stage of the activity using the input, wherein the instructional data is selected using the new skeletal map.

21. The method of claim 16, wherein selecting the instructional data using the skeletal map further comprises:

calculating an angle and a distance between points in the skeletal map;

evaluating the angle and the distance using a set of rules; and selecting the instructional data based on the evaluating.

* * * * *